United States Patent [19]

Barber

[11] Patent Number: 4,702,571

[45] Date of Patent: Oct. 27, 1987

[54] INSTRUMENT FOR VISUAL OBSERVATION UTILIZING FIBER OPTICS

[76] Inventor: Forest C. Barber, 2925 Race St., Fort Worth, Tex. 76111

[21] Appl. No.: 805,509

[22] Filed: Dec. 5, 1985

Related U.S. Application Data

[63] Continuation-in-part of Ser. No. 494,358, May 13, 1983, abandoned.

[51] Int. Cl.[4] ............... G02B 21/22; G02B 23/26; G02B 23/16
[52] U.S. Cl. .................... 350/516; 350/543; 350/557; 350/567
[58] Field of Search .............. 350/506, 515–516, 350/540–544, 522, 557, 567, 576, 94.26, 588–590, 513–514, 550–556; 128/4–9; 250/227; 356/241

[56] References Cited

U.S. PATENT DOCUMENTS

| | | | |
|---|---|---|---|
| 807,713 | 12/1905 | Berger | 350/550 |
| 3,068,739 | 12/1962 | Hicks, Jr. et al. | 128/634 |
| 3,383,151 | 5/1968 | Kohler et al. | 350/567 |
| 3,501,218 | 3/1970 | Zitzelberger | 350/576 |
| 3,515,465 | 6/1970 | Jones | 350/589 |
| 3,520,587 | 7/1970 | Tasaki et al. | 350/506 |
| 3,655,259 | 4/1972 | Miyauchi et al. | 350/515 |
| 4,012,110 | 3/1977 | Schael et al. | 350/514 |
| 4,198,959 | 4/1980 | Otani | 128/5 |
| 4,267,828 | 5/1981 | Matsuo | 128/6 |
| 4,339,200 | 7/1982 | Corbin | 356/241 |
| 4,341,205 | 7/1982 | Hosono et al. | 350/588 |
| 4,390,012 | 6/1983 | Mizumoto | 128/4 |
| 4,447,139 | 5/1984 | Biber | 350/516 |
| 4,517,963 | 5/1985 | Michel | 128/6 |

FOREIGN PATENT DOCUMENTS 1217300 12/1970 United Kingdom ............ 128/6

*Primary Examiner*—William H. Punter
*Attorney, Agent, or Firm*—James E. Bradley

[57] ABSTRACT

An instrument includes a main housing, carrying laterally adjustable eyepieces, and a probe housing which is connected to the main housing by means of a flexible joint or coupler. This flexible joint allows relative articulation and rotation of the two housings, and is provided with locking means for selectively locking and unlocking the joint. The joint area is enclosed with a liquid sealing boot; and operating levers for the lock may be actuated through the boot. The optics include left and right proximal lens systems disposed in respective eyepieces, distal left and right lens systems disposed at the distal end of the probe housing, and inter-connecting elongated flexible image conducting fiber bundles which pass through the flexible coupling. The distal lens systems are mounted with their optical axes converging toward each other to enable depth perception of the area to be viewed. An elongated flexible light conducting fiber bundle extends from the distal end of the probe housing to an adaptor in the main housing for connection to a suitable light source to project light to the area to be viewed.

4 Claims, 16 Drawing Figures

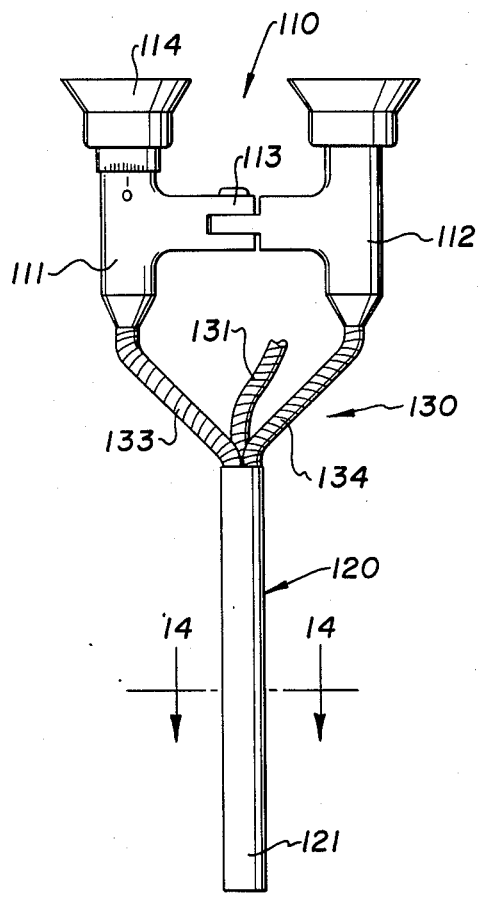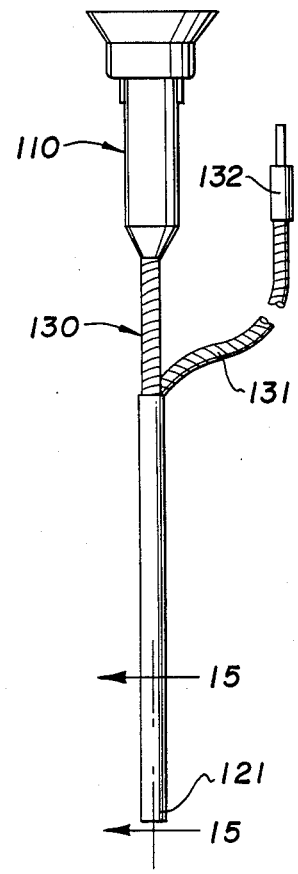
Fig. 12     Fig. 13
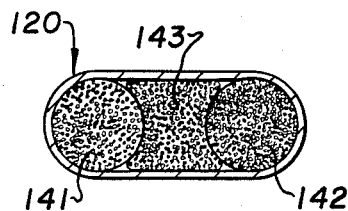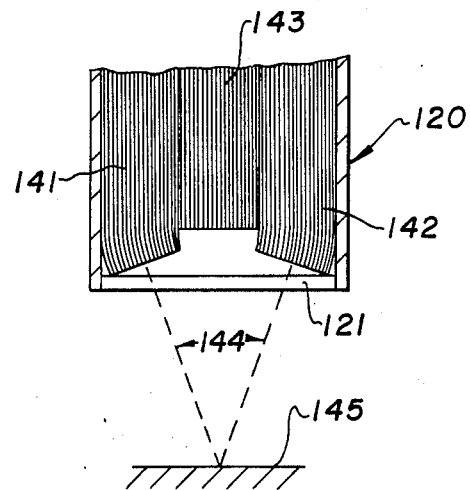
Fig. 14     Fig. 15

INSTRUMENT FOR VISUAL OBSERVATION UTILIZING FIBER OPTICS

BACKGROUND AND SUMMARY OF THE INVENTION

This is a continuation-in-part of application Ser. No. 494,358, filed May 13, 1983, now abandoned.

This invention relates to an instrument or apparatus such as a medical endoscope or an industrial borescope for the visual observation of internal areas of difficult visual access; and more particularly to such an instrument or apparatus which utilizes fiber optics to obtain three dimensional viewing of the desired internal area or object.

Three dimensional endoscopes utilizing fiber optics are known in the prior art, one example of such apparatus being described in Tasaki et al, U.S. Pat. No. 3,520,587.

This invention is particularly concerned with a form of endoscope, known as an arthroscope, which is designed to observe the interior of a human joint such as a knee or elbow. Arthroscopes are frequently used for diagnostic purposes to observe, for example, the articular surfaces and detect disease processes, or to detect improper alignment or damage to bones or other tissues. Such arthroscopes include an elongated housing having a distal viewing end, which housing may be inserted into a joint through a small entry orifice. Devices have been developed which enable the performance of arthroscopic surgery inside a joint; and these surgical devices are guided by the surgeon through the use of an arthroscope. When performing surgery, or otherwise viewing subjects in an interior area such as an anatomical joint, it is often difficult to judge distances and sizes properly; and this is particularly true when the arthroscope has a single viewing system and is therefore monocular.

To enable most effective use of such apparatus, it is desirable that the apparatus provide for steroscopic viewing of the subject and it is further desirable that the instrument be constructed in a manner that the above mentioned elongated housing can be inserted into the joint with the viewing end placed at the desired location within the joint, and that the portion of the instrument including the eyepieces be positionable relative to that elongated housing to enable convenient viewing of the subject by a surgeon who is performing delicate and critical surgical procedures for example, such as cutting away bone or tissue.

For this purpose, it is desirable that the arthroscopic apparatus or instrument be provided with some form of flexible joint between the elongated housing which is inserted into the joint area and the main housing which carries the eyepieces, to enable selected bending of these two instrument housings and also preferably enable some relative rotation. It is further desirable that such instrument be provided with means to lock up that flexible joint to fix the selected positions of the two housing portions. This will enable the instrument to be mounted, as by clamping, in fixed relation to the anatomical member during surgery, and provide convenient access to the eyepieces of the instrument without the danger of moving the instrument out of preselected alignment should the user bump the eyepieces for example.

The applicant is not aware of any medical endoscope or industrial borescope which is provided with a flexible coupling or joint between the elongated housing portion for insertion into an interior area, and the exterior main housing portion which carries the eyepieces.

An object of this invention is to provide an improved instrument for visual observation of internal areas, which instrument includes a flexible joint between an elongated probe housing and an exterior housing carrying the eyepieces.

Another object of this invention is to provide such an improved instrument where the flexible joint allows changes in both the angular relationship and the rotational relationship of the two housings.

A further object of this invention is to provide such an improved instrument wherein the flexible joint may be locked to fix the selected angular and/or rotational relationship of the two housings.

A further object of this invention is to provide an improved instrument for visual observation of internal areas, which instrument provides for three dimensional viewing of such internal areas.

Still another object of this invention is to provide such three dimensional instrument which utilizes fiber optics.

A still further object of this invention is to provide an improved instrument for visual observation of internal areas which instrument is simple in design and which is economic with respect to initial cost and maintenance.

Another object of this invention is to provide an improved instrument or apparatus for visual observation of internal areas which is very convenient and effective in use.

These objects are accomplished in an instrument which includes the following components. A main housing carries a pair of eyepiece assemblies each of which includes a proximal lens system. The proximal end of an elongated probe housing is connected to the main housing by a flexible coupling. Two distal lens systems are mounted at the distal end of the probe housing, having their optical axes angled relative to each other to enable three dimensional viewing of an area spaced from that distal end. Two flexible bundles of elongated image conducting fibers extend from the main housing through the flexible coupling, and through the probe housing to the distal end thereof. The distal ends of the two image conducting fiber bundles are connected in image transmitting association with respective ones of the distal lens systems. The proximal ends of the two image conducting fiber bundles are connected to the eyepiece assemblies for image transmitting association with respective ones of the proximal lens systems.

More particularly, the flexible coupling may consist of a universal type joint which enables the probe housing to be positioned at a selected angle relative to the main housing, and enables the probe housing to be rotated to a limited extent relative to the main housing. Also more particularly the universal type joint may include lock up means for fixing the selected relative orientation of the two housings.

The novel features and the advantages of the invention, as well as additional objects thereof, will be understood more fully from the following description when read in connection with the accompanying drawings.

DRAWINGS

FIG. 12 is a top view of another form of instrument according to the invention;

FIG. 13 is a side view of the instrument of FIG. 12;

FIG. 14 is a transverse sectional view taken along the line 14—14 of FIG. 12; and FIG. 15 is a fragmentary longitudinal sectional view taken along the line 15—15 of FIG. 13.

DESCRIPTION OF THE PREFERRED EMBODIMENT

Figure 1:
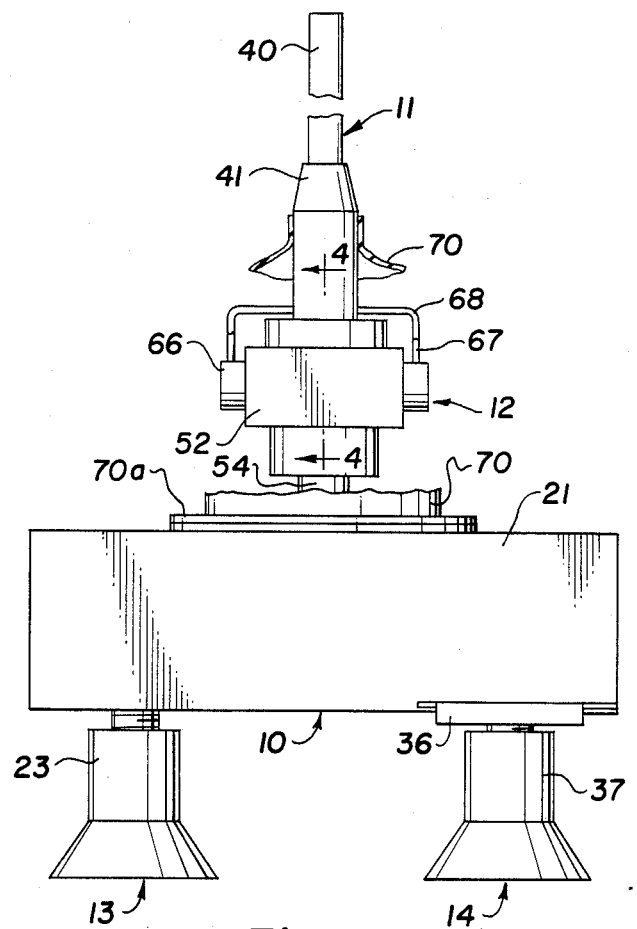
FIG. 1 is a top view of an instrument according to the invention.

FIGS. 1 through 11 of the drawings illustrate one form of instrument designed for use as an arthroscope. This instrument is quite small in size, being only large enough to accommodate the several structural components of the instrument necessary for its operation. The instrument consists basically of a main housing 10 which has an elongated box shape, a probe housing 11 which extends transversely from the center of the main housing and is connected to the main housing by a universal type joint 12, and left and right eyepiece assemblies 13 and 14 to provide a binocular instrument capable of observing an internal area with depth perception. The right eyepiece assembly is mounted for lateral movement on the housing, to enable adjustment of the distance between the eyepieces to accommodate different interpupillary distances of various users. The distance between the optical axes of the eyepiece assemblies may be varied from a minimum of 2⅜ inches to a maximum of 2 13/16 inches, for example; and the means for making that adjustment will be described subsequently.

The optics for the instrument include two proximal lens systems located in the eyepiece assemblies to be described, two distal lens systems located at the distal end of the probe housing 11 to be described, with respective pairs of left and right proximal and distal lens systems being connected by respective left and right elongated flexible image conducting fiber bundles 15 and 16. Each of these bundles consists of a substantial number of very small elongated flexible coated fibers of glass or other suitable material. At the ends of the bundle, the fibers are arranged in the same desired orientation relative to each other; and the ends of the bundles are made rigid by a suitable bonding material to maintain that prearranged orientation, and to permit the mounting of the bundle ends in the desired orientation relative to an associated lens system. The entire bundle may be clad in a suitable sheath for protection.

Another component of the instrument is an elongated flexible light conducting fiber bundle 17 which extends from the distal end of the probe housing 11 into the main housing 10 for connection to a suitable adaptor to enable connection to a source of light. The light conducting bundle 17 may have generally the same configuration as the image conducting bundles, except that the fibers need not be maintained in any particular orientation at the ends. The ends of the bundle may be made rigid by means of a suitable bonding material for the purpose of connection to associated structures and also to enable grinding and polishing.

An instrument which is designed for use as an arthroscope, or other endoscope, must be designed to enable sterilization with a liquid cleansing medium; and for this purpose all portions of the instrument must be suitably sealed against ingress of liquid. The universal joint 12, for example, is enclosed with a suitable sealing boot; and this and other sealing structures will be described subsequently.

Figure 3:
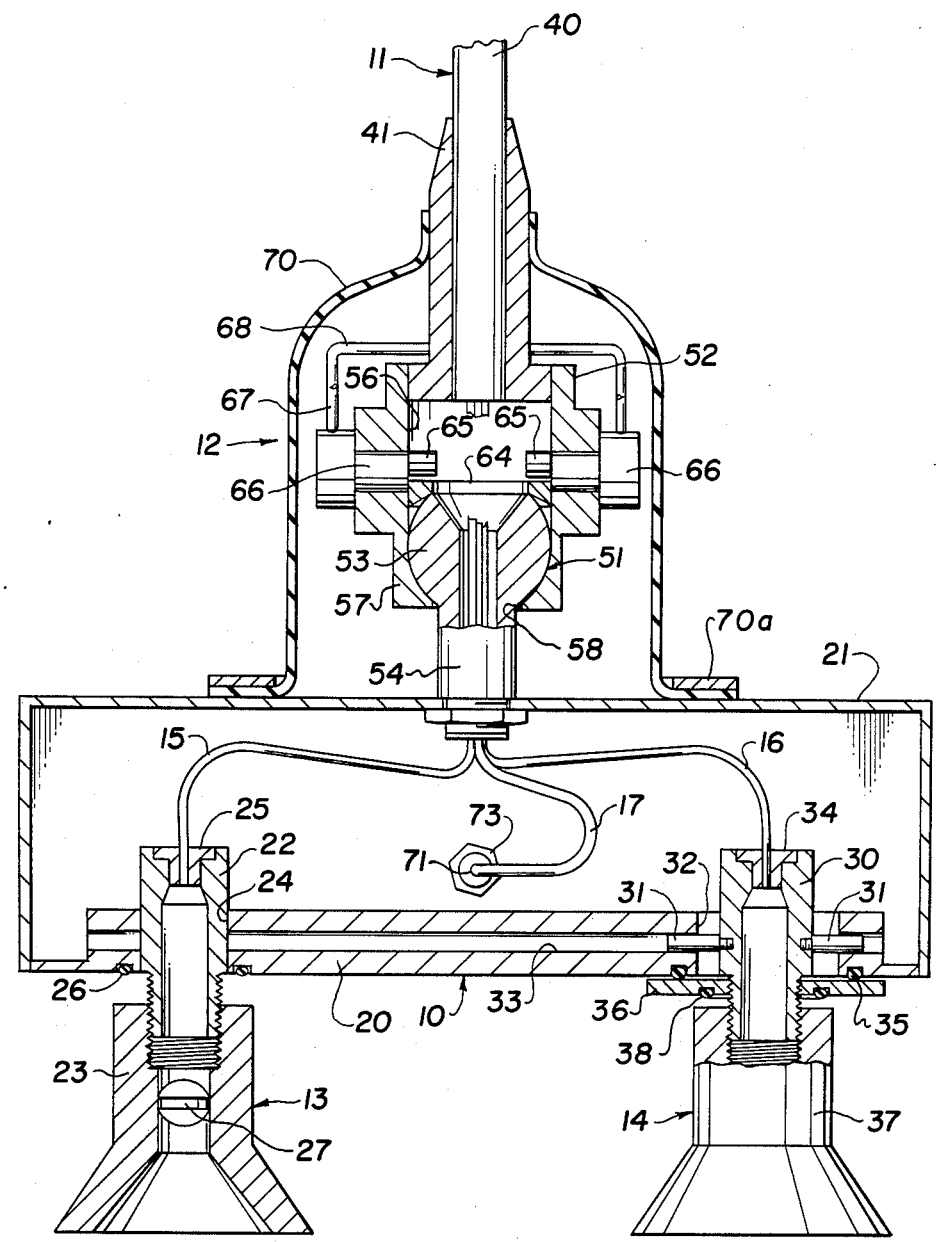
FIG. 3 is a sectional view of the instrument of FIG. 1, taken along the line 3—3 of FIG. 2.

In the form of instrument illustrated in FIG. 3 of the drawings paticularly, the main housing 10 preferably consists of a front plate 20 and an elongated hollow box 21 which, in final assembly, are joined together by means of screws and are sealed with an epoxy for example. The front plate 20 is a member of substantial thickness, fabricated from metal or other suitable material, and is the mounting base for the eyepiece assemblies.

The left eyepiece assembly 13 is the fixed assembly; and its basic components are a generally cylindrical adaptor 22 having one externally threaded end, and an eyepiece 23 having an internally threaded end for threaded engagement with the adaptor. The adaptor 22 is secured within a cylndrical bore 24 in the front plate 20, by means of suitable set screws for example, with the threaded end projecting from the front face of the front plate. The proximal end of the left image-conducting bundle 15 is secured within a suitable plug 25 which is configured to be received within a suitable central recess at the inner end of the adaptor 22. The extreme proximal end of the image conducting bundle is polished and ground for coaction with the associated lens system to be described. Then proximal end of the bundle may be secured within the plug 25 and the plug may be secured within the adaptor by means of suitable set screws, for example. An annular groove is provided in the front face of the front plate 20, adjacent to and surrounding the bore 24 to receive a sealing O-ring 26 which is dimensioned to project from that front face.

The eyepiece 23 has a generally cylindrical body and an enlarged eyecup. Mounted within the central passage of the eyepiece is the left proximal lens system which may be an achromat 27 consisting of two semispherical lenses and an intervening flat lens. The threaded junction of the eyepiece 23 and adaptor 22 enables focusing of the lens system relative to the proximal end of the image conducting bundle 15; and the inner face of the eyepiece body is dimensioned to seat on the O-ring 26 when the eyepiece is fully threaded toward the front plate 20. This seating should be effected for sterilizing the instrument to prevent any ingress of liquid at the eyepiece assembly. The achromat 27 is suitably sealed within the eyepiece against liquid ingress.

Figure 2:
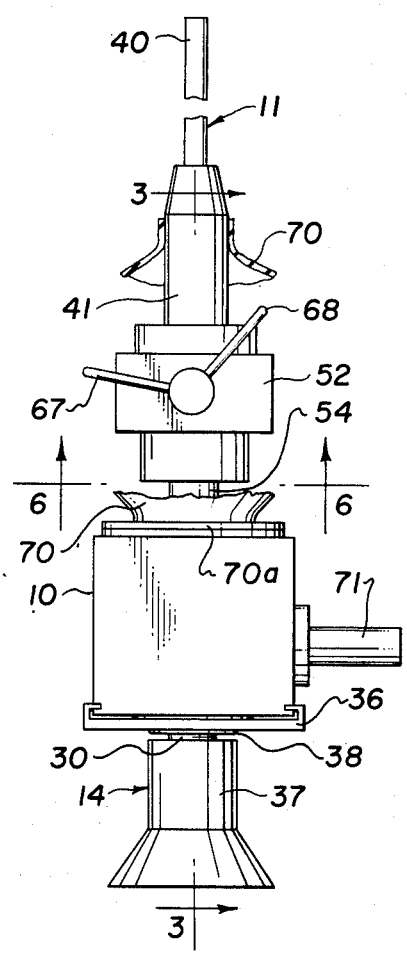
FIG. 2 is a side view of the instrument of FIG. 1.

The right eyepiece assembly 14 is generally similar in structure to the left eyepiece assembly, but includes structural features to enable lateral movement of the entire assembly relative to the front plate 20 to provide the interpupillary adjustment. The adaptor 30 has the same configuration as the adaptor 22, except that it is provided with opposed threaded recesses at opposite sides thereof to receive threaded cylindrical studs 31. The front plate 20 is provided with a transverse elongated or ovoid shaped bore 32 to receive the cylindrical body of the adaptor 30 and to permit limited sidewise movement of the adaptor within the front plate. The front plate is also provided with an elongated longitudinal bore 33, extending the length of the front plate, and intersecting the bore 32. This longitudinal bore 33 is dimensioned to receive the studs 31 which are inserted through the bore from either end and threaded into the adaptor; and in this manner the adaptor is mounted and located within the front plate with its threaded end projecting from the front face. The outer ends of the studs 31 have suitable slots or recesses to enable the threading of these studs to the adaptor by a suitable tool. The right image conducting bundle 16 is secured to the adaptor 30 by means of a plug 34 in a manner similar to that of the left image conducting bundle. The front face of the front plate is again provided with a suitable groove close to and surrounding the ovoid bore 32 to accommodate a sealing O-ring 35 which projects from the front face. An interpupillary slide 36 is a channel-shaped member, as best seen in FIG. 2, which overlies the ovoid bore 32 and is provided with a cylindrical bore to receive the threaded end of the adaptor 30. The side flanges of the slide 36 extend over the edges of the front plate 20, and include confronting lips which are received in grooves provided in the side edges of the front plate. These grooves are of sufficient length to allow endwise movement of this interpupillary plate which effects the lateral adjustment of the entire right eyepiece assembly. It will be seen that interpupillary plate is retained on the front plate by means of the coacting lips and grooves; and the parts are dimensioned that the O-ring 35 provides some frictional restraint to movement of the eyepiece assembly. An annular groove in the front face of the slide 36 receives a sealing O-ring 38 for coaction with the eyepiece.

The right eyepiece 37 has the same configuration as left eyepiece 23, carrying the right proximal lens system or achromat, and is threadedly mounted on the adaptor for focusing in the same manner. For the sealing of this right eyepiece assembly, the right eyepiece is fully threaded to bear against the interpupillary slide 36 which tightly seals the housing through the O-rings 35 and 38 for sterilization purposes. When the right eyepiece is released from the sealing condition, it will be seen that the right eyepiece assembly may be readily moved to select the desired interpupillary distance.

Figure 8:
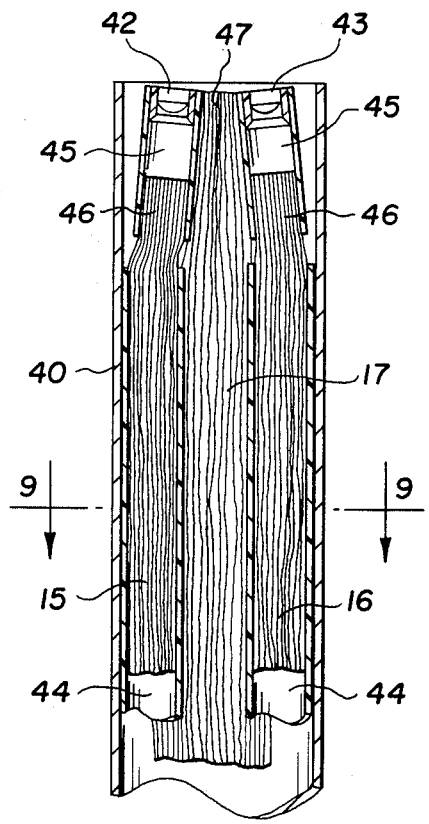
FIG. 8 is a fragmentary longitudinal sectional view of the probe housing, as viewed from the top of the instrument.
Figure 9:
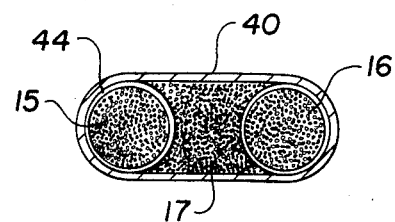
FIG. 9 is a transverse sectional view of the probe housing, taken along the line 9—9 of FIG. 8.
Figure 10:
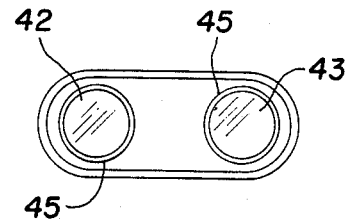
FIG. 10 is a view of the probe housing from its distal end.

The probe housing 11 consists of an elongated tubular sheath 40 fabricated of metal or other suitable material, and having an adaptor 41 fixed at its proximal end to enable the securing of the probe housing to the universal joint 12. For an instrument such as an arthroscope, the probe housing is preferably flat to enable insertion between anatomical members which may have to be separated for the purpose of inserting the arthroscope and another surgical instrument for example. The probe housing is of rigid construction to enable placement of the distal end at the desired location. As best seen in FIGS. 8 to 10, the probe housing is generally ovoid in cross section to accommodate the side-by-side disposition of the left and right image conducting bundles and the light conducting bundle which is disposed between the two image conducting bundles. At the distal end of the probe housing, left and right distal lens systems 42 and 43 are mounted with their optical axes arranged to converge toward each other at a point spaced from the distal end of the housing and generally aligned with the central longitudinal axis of the probe housing. This arrangement of the lens systems enables the viewing of an area spaced from the distal end of the housing with depth perception. The distal end of the light conducting bundle 17 is aligned along that central longitudinal axis of the housing and projects light to the area which is to be viewed.

FIG. 8 is a longitudinal cross sectional view of the distal end portion of the probe housing 11, as viewed from the top of the instrument, illustrating the wide dimension of the sheath 40 and the generally side-by-side relation of the left and right image conducting bundles 15 and 16, being separated by the loose fibers of the light conducting bundle 17. Each of the image conducting bundles is enclosed by an inner sheath 44 to separate the image conducting bundles from the light conducting bundle. The outer sheath 40 is fabricated of metal, for example, for rigidity. As best seen in FIG. 9, the image conducting bundles are disposed toward the opposite outer edges of the outer sheath and are separated by the fibers of the light conducting bundle which are not confined and occupy the space between the two image conducting bundles.

The above mentioned convergence of the left and right lens systems is accomplished by mounting the respective lenses 42 and 43, achromats for example, in respective lens tubes 45 which define the optical axes of the lens systems; and these tubes are secured in the desired orientation within the distal end of the sheath 40 by a suitable cement. These tubes are mounted with distal ends approximately flush with the distal end of the sheath 40; and the respective lenses 42 and 43 are located adjacent to the distal ends of those tubes. The rigid distal ends 46 of the two image conducting bundles are secured in the proximal ends of the lens tubes, these rigid ends of the image conducting bundles having been ground and polished for coaction with the respective lenses 42 and 43. The distal end portion 47 of the light conducting bundle 17, adjacent to the lens tubes 45, is also rigidified by a suitable cement so that it may be polished and ground to enable the most efficient light projection to the area to be viewed. After completion of assembly, the entire distal end of the probe housing, including the distal ends of the lens tubes, is sealed to prevent ingress of liquid at any time.

Referring now particularly to FIG. 3, the universal joint 12 for coupling the probe housing 11 to the main housing 10 includes a ball member 51 and a socket housing 52. The ball member 51 is elongated and hollow, having an enlarged spherical ball portion 53, and having a cylindrical shank 54 including a threaded nipple at its proximal end to be received in an opening in the back of the main housing box 21, to be secured in that housing box in sealing relation by a suitable nut. The socket housing 52 is a box-like member having a longitudinal generally cylindrical bore 56 which includes a spherical socket portion 57 at its proximal end for coaction with the ball 53. The opening 58 at the proximal end of the socket portion is dimensioned only slightly larger than the ball member shank 54, except as will be described subsequently to permit limited articulation and rotation of the socket housing relative to the ball member.

Figure 6:
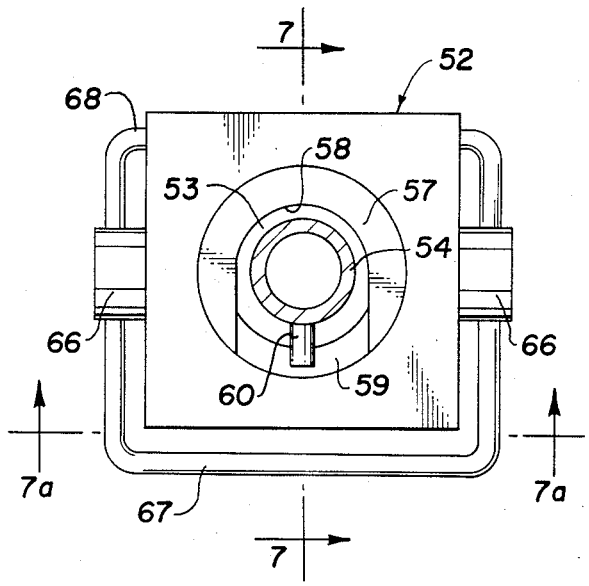
FIG. 6 is a detail view taken along the line 6—6 of FIG. 2 illustrating the articulation and rotation control for the coupler.
Figure 7:
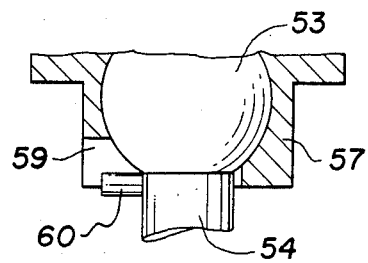
FIG. 7 is a sectional detail view taken along the line 7—7 of FIG. 6.
Figure 7A:
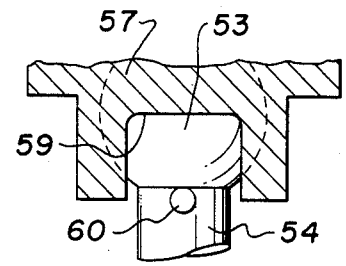
FIG. 7a is a fragmentary view taken along the line 7a—7a of FIG. 6, further illustrating the articulation and rotation control.

As best seen in FIGS. 6, 7 and 7a, a slot 59 is formed in the front face of the socket portion 57; and this slot is dimensioned to receive the neck 54 of the ball member to allow swinging of that neck forward relative to the socket housing. A set screw or pin 60 projects from the ball 53 into the slot 59, and is disposed adjacent to the neck 54. This pin 60, coacting with the slot 59 limits upward rotation of the ball member relative to the socket housing to an angle of about 45°. The relative dimensions of the neck 54 and the opening 58 and slot 59 limit lateral articulation of the ball member to a much lesser angle, 10° from center for example; and the coaction of the pin 60 and slot 59 limits relative rotation of the ball member and socket housing to a total angle of about 40°, or 20° to either side of center. These limits, of course, define the limits of articulation and rotation of the main housing 10 relative to the probe housing 11.

The universal joint 12, as best seen in FIG. 3, is designed to enable locking of the joint in a selected articulated and rotated position; and this is accomplished by means of an annular locking ring 64 configured to be received within the bore 56 and bear on the distal end portion of the spherical ball 53. This locking ring is manipulated by a confronting pair of eccentric cams 65 which are carried on headed shafts 66 both rotatably supported in the socket housing 52. A pair of U-shaped or bail-like levers 67 and 68 are mounted on the two headed shafts 66 to project, respectively, upwardly and downwardly from the socket housing 52 and across the housing and the adaptor 41 as best seen in FIG. 1. This assembly of the two-headed shafts 66 and levers 67 and 68 defines a rocking lever for effecting the locking and unlocking of the universal joint. The upper lever 67 is the locking lever and the lower lever 68 is the unlocking lever. These levers are actuated alternatively to rock or rotate the shafts 66 and associated cams 65 between locking and unlocking positions; and these levers are U-shaped or ball-shaped to enable manipulation of the rocking lever through a sealing boot 70. This boot 70, as best seen in FIG. 3, is a rubber-like boot clamped or otherwise secured at one end to the adaptor 41 and at the other end to the housing 10 by means of a clamping ring 70a to prevent any liquid from entering the universal joint area of the instrument.

Figure 4:
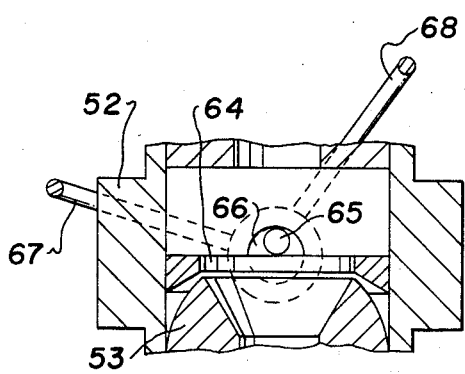
FIGS. 4 and 5 are fragmentary detail views, taken along the line 4—4 of FIG. 1, illustrating the operation of the coupler lock.
Figure 5:
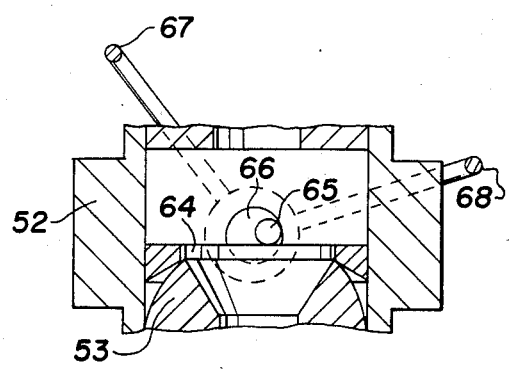

The operation of the universal joint locking mechanism is illustrated in FIGS. 4 and 5. In FIG. 4, the lever rocking has been pushed upward, to rotate the shafts 66 to position the eccentric cam 65 at the rearwardmost position to release the locking ring 64 from the ball 53. In FIG. 5, the rocking lever has been urged downwardly to wedge the locking ring 64 into engagement with the ball 53 by means of the eccentric cams 65; and relative movement of the ball member and socket housing is thereby prevented.

The probe housing adaptor 41 is dimensioned to be received within the distal end of the socket housing 52, and is secured therein by any suitable means such as set screws.

Figure 11:
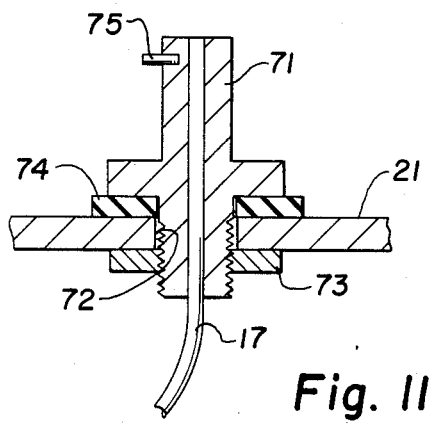
FIG. 11 is a detail sectional view of the housing adaptor for the proximal end of the light conducting fiber bundle.

The proximal end of the light conducting fiber bundle 17 is secured in the main housing box 21 by means of an adaptor 71 as seen in FIGS. 3 and 11. This distal end of the bundle is disposed within the longitudinal bore of the adaptor, and secured at the outer end by means of a suitable sealing cement. The adaptor may be an elongated member having an inner threaded end which is received within a hole 72 in the housing wall, with the adaptor being secured by an internal nut 73. A sealing washer 74 secures the adaptor mounting against ingress of liquid. The outer end of the adaptor, including the distal end of the bundle may be polished and ground to provide for efficient light transmission between this adaptor and a coacting light cable. The outer end of the adaptor may have a projecting pin 75, so that the adaptor defines one member of a bayonet type coupling by means of which a light cable may be connected to the instrument to function as the light source for the instrument.

Embodiment of FIGS. 12 through 15

Referring to FIGS. 12 through 15, another form of apparatus according to the invention includes a rigid ocular housing 110 defining the ocular end of the apparatus, an elongated rigid viewing housing 120 defining the viewing end of the apparatus, and a flexible housing section 130 connecting the viewing housing to the ocular housing.

The ocular housing 110 has a configuration similar to that of conventional binoculars, having juxtaposed housing sections 111 and 112 connected together by a hinge 113. The hinged housing sections are adjustable to accommodate the varying distances between the eyes of several users. The two housing sections enclose similar lens systems; and one housing section has a focusing eyepiece 114 to accommodate differences in the two eyes of a user.

The viewing housing 120 consists of an elongated tubular sheath fabricated of metal or other suitable material to provide a rigid housing, to enable manipulation of the housing to place its image collecting end 121 in the desired relation to the subject to be viewed. This viewing housing is very narrow, to enable insertion through a small opening in the skin of a patient for example when used in connection with arthroscopic examination or surgery. As seen in the drawings, this viewing housing is ovoid in cross section and may have a maximum dimension of 6.0 mm or less and a minimum dimension of 4.5 mm or less. The length of the viewing housing 120, as we as the overall length of the apparatus, may vary considerably in relation to the intended use of the apparatus; however by way of example the viewing housing may have a length of about 50 mm.

The apparatus includes three separate fiber optic systems, each consisting preferably of a bundle of optic fibers for transmitting light. Two of these fiber optic systems 141 and 142 are optical image transmitting systems; and these extend from the image collecting end 121 of the viewing housing 120 to the respective housing sections 111 of the ocular housing 110 where they coact with respective lens systems in those housing sections. The third fiber optic system 143 is provided for transmitting illumination to the image collecting end of the viewing housing 120; and this system extends from a point adjacent to the image collecting end 121, through the viewing housing 120, and beyond the proximal end of the viewing housing 120 being enclosed in a flexible sheath 131. A terminal coupler 132 is fixed to the end of the fiber optic system 143 and its flexible sheath 131 for coaction with the end face of the fiber optic system. This coupler 132 is designed to be readily coupled to a light source and effects the transfer of illumination to the fiber optic system 143.

The two fiber optic systems 141 and 142 are also enclosed within the viewing housing 120 and, at the point of emergence from the viewing housing, are enclosed in respective separate flexible sheaths which are then joined to respective ends of the ocular housing sections 111 and 112. These flexible sheaths 133 and 134 form a flexble housing section 130 coupling the ocular housing 110 to the viewing housing 120; and this flexible housing section will have a suitable length to enable the desired movement of the ocular housing relative to the viewing housing.

FIG. 14 of the drawing illustrates the juxtaposed relation of the fiber optic systems 141, 142 and 143 within the elongated viewing housing 120. As mentioned, this housing is ovoid in cross section; and it will be seen that the two image transmitting systems 141 and 142 are disposed at the outer extremities of the ovoid section, while the illumination system 143 is disposed between the two image transmitting systems. These three systems then will extend parallel to each other through the length of the viewing housing, except at the image collecting end 121. As best seen in FIG. 15, the illumination fiber optic system 143 may terminate short of the housing end, to allow for a slight bending of the ends of the image fiber optics systems toward each other to provide a focusing paralax angle 144. The end faces of the imaging fiber optics systems 141 and 142 are oriented relative to this paralax angle so that the two systems will provide overlapping images of the subject 145 viewed to provide the steroscopic effect.

The end face of the illumination fiber optics system 143 is disposed to project the transmitted light between the two imaging fiber optics systems and onto the subject 145 which is viewed by those imaging systems.

What has been described is a unique instrument for surgical or other purposes to enable the viewing of interior areas of difficult access with depth perception. A feature of the instrument is a rigid elongated narrow probe housing having a distal optical or lens system at its distal or remote end for selective placement into confined surgical or other areas to be viewed.

Another feature is that the instrument includes that rigid probe housing and a main housing carrying eyepieces, which housings are connected by a flexible joint or coupling which enables selective relative articulation and rotation of the housings, and which flexible joint or coupling can be locked to fix that selected orientation. Such instrument may be clamped to a suitable fixture to provide a most comfortable viewing position of the eyepieces for the user.

Another feature of the instrument is the use of flexible fiber optics to conduct light to the viewing area and to transmit the image back to the instrument eyepieces, enabling economy of construction and efficiency in use.

Still another feature of the instrument is the simple and efficient adjustment of the eyepieces to accommodate different interpupillary distances of various users.

While the drawings are lined to indicate that most of the components of the instrument are fabricated from metal, it will be understood that these parts may be fabricated from any suitable material.

By way of example, an arthroscope as illustrated in FIGS. 1 through 11 may have the following dimensions. The main housing may be about 10.2 cm wide, about 1.8 cm in height, and about 1.9 cm in depth. The probe housing may be of any desired length, and have maximum and minimum cross sectional dimensions of 6 mm and 2.5 mm. The depth of the instrument from the front of the eyepieces 13 and 14 to the back of the universal joint 12 is about 10.8 cm; and the length of the probe housing 11 may be 6.35 cm or any desired longer length.

While preferred embodiments of the invention have been illustrated and described, it will be understood by those skilled in the art that changes and modifications may be resorted to without departing from the spirit and scope of the invention.

What is claimed is:

1. An instrument for internal visual observation comprising a main housing;
   two eyepiece assemblies mounted on said main housing for binocular use;
   a proximal lens system mounted in each of said eyepiece assemblies;
   an elongated probe housing; flexible coupling means for connecting the proximal end of said probe housing to said main housing; said flexible coupling comprising a universal type joint enabling universal movement of said probe housing relative to said main housing;
   two distal optical systems mounted at the distal end of said probe housing, having their optical axes angled relative to each other so as to provide depth perception in an area spaced from said distal end;
   two elongated flexible image conducting fiber bundles extending from said main housing, through said flexible coupling, and through said probe housing to the distal end thereof; the distal ends of said two image conducting fiber bundles being connected in image transmitting association with respective ones of said distal optical systems; the proximal ends of said two image conducting fiber bundles being connected to respective ones of said eyepiece assemblies in image transmitting association with respective ones of said proximal optical systems;
   locking means for locking said universal type joint, whereby said probe housing may be positioned rigidly in a selected position relative to said housing.

2. An instrument as set forth in claim 1 including said locking means including a rocking lever, movable in one direction to effect the locking of said locking means, and movable in the other direction to effect the unlocking of said locking means.

3. An instrument as set forth in claim 2 including
   said locking means comprising a cam lock for effecting the binding of said universal type joint; and said rocking lever actuating said cam lock to effect the binding and releasing of said universal type joint.

4. An instrument as set forth in claim 2 including
   a sealing boot enclosing said universal type joint; said rocking lever being operable by the user through said boot.

* * * * *